United States Patent

[11] 3,532,124

| [72] | Inventor | Nicholas Jerry Lowery |
| | | 300 Driftwood Drive W., Baywood Village, |
| | | Palm Harbor, Florida 33563 |
| [21] | Appl. No. | 735,774 |
| [22] | Filed | June 10, 1968 |
| [45] | Patented | Oct. 6, 1970 |

[54] WATER PIPE ANTI-KNOCK DEVICE
5 Claims, 4 Drawing Figs.

[52] U.S. Cl. .................................................. 138/26
[51] Int. Cl. .................................................. F16l 55/04
[50] Field of Search ........................................ 138/26, 37, 39, 30

[56] References Cited
UNITED STATES PATENTS
| 2,795,374 | 6/1957 | Isakoff .................... | 138/26 |
| 2,841,236 | 7/1958 | Moerke .................... | 138/26 |

*Primary Examiner*—Fred C. Mattern, Jr.
*Assistant Examiner*—R. J. Sher

ABSTRACT: A device adapted for use with a water line to eliminate "knocking" or water shock when the water flow is turned off or turned on. The device uses a trapped air pocket and an internal water whirling action to accomplish this result.

Patented Oct. 6, 1970

3,532,124

INVENTOR.
N. JERRY LOWERY

3,532,124

WATER PIPE ANTI-KNOCK DEVICE

SUMMARY OF THE INVENTION

My invention employs first and second concentric hollow cylinders scaled at both ends, each end having an aperture communicating with the inner cylinder. The annular space between the cylinders is thus sealed off and contains trapped air.

A first hollow curved tube disposed in the inner cylinder is secured to the aperture in one cylinder end and itself has an open end pointing toward this same aperture.

A second hollow tube disposed in the inner cylinder is secured to the aperture in the other cylinder end and also has an open end pointing toward the aperture in the other cylinder end.

When water flows into the inner cylinder through one aperture, it flows through one tube, then whirls around and flows out through the other tube. This whirling action, together with the absorption action of the trapped air, eliminates water shock or "knocking" when the water flow is initiated or cut off.

DETAILED DESCRIPTION OF PREFERRED EMBODIMENTS

Figure 1:
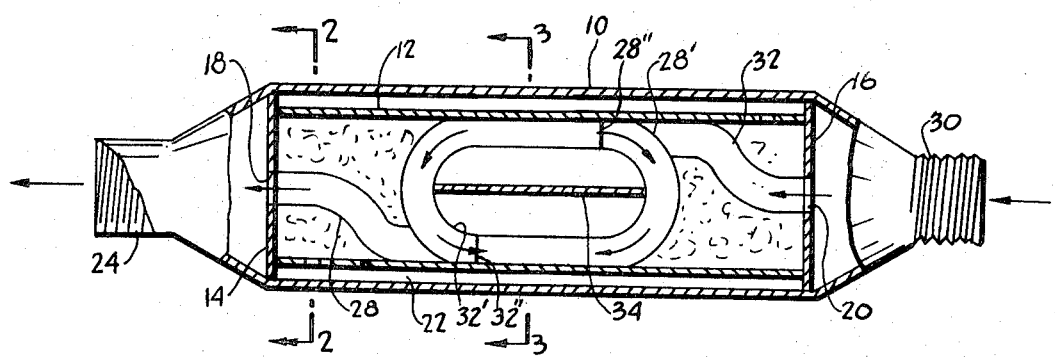
FIG. 1 is a cut away side view of my device.
Figure 2:
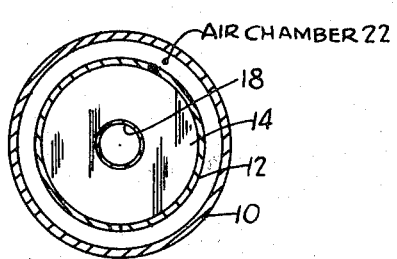
FIG. 2 is a view through 2–2 in FIG. 1.
Figure 3:
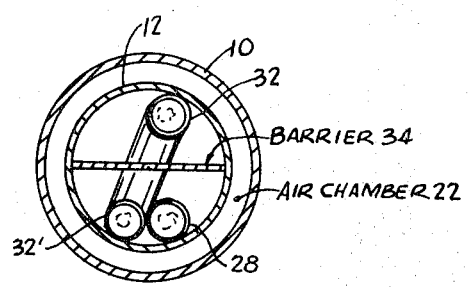
FIG. 3 is a view through 3–3 in FIG. 1.
Figure 4:
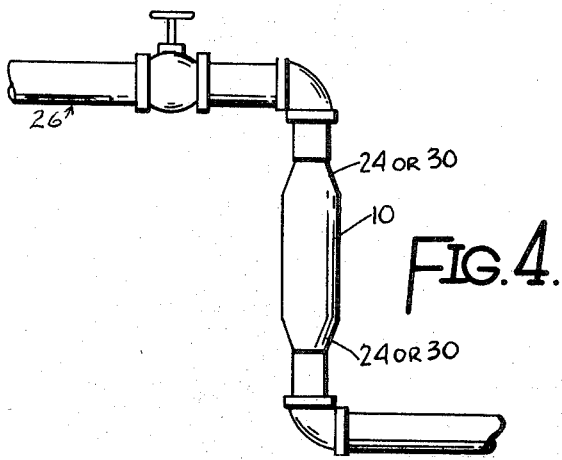
FIG. 4 illustrates my device in use.

Referring now to FIGS. 1—4, first and second hollow concentric cylinders 10 and 12 are sealed at opposite ends by discs 14 and 16. Disc 14 has an aperture 18 communicating with one end of inner cylinder 12. Disc 16 has an aperture 20 communicating with the opposite end of cylinder 12. The annular space 22 between the cylinders contains trapped air.

Discs 14 and 16 can be secured to threaded fitting 30 or sweat fitting 24 for insertion in a water line 26.

A first hollow tube 28 having the general shape of a question mark has one open end secured to aperture 18 and an opposite curved end 28' pointing toward aperture 18. A second like shaped tube 32 has one open end secured to aperture 20 and an opposite curved end 32' pointing toward aperture 20.

The free ends 28' and 32' are disposed on opposite sides of a flat barrier plate 34 which extends diametrically (in cross section) across cylinder 12 and has its longitudinal axis aligned with the axis of the cylinders.

Water can flow in for example via fitting 30, through aperture 20, through tube 32 out of opening 32", pass along plate 34 into a region of whirling or turbulence, through opening 28", through tube 28 and out of aperture 18 to exit through fitting 24.

The net result is the elimination of water shock or "knocking."

While I have described my invention with particular reference to the drawings, such is not to be considered as limiting its actual scope.

I claim:

1. A device adapted to be installed in a water pipe to eliminate knocking caused by water surges, said device comprising:
   first and second concentric hollow cylinders sealed at both ends, each end having an aperture communicating with the inner cylinder, the annular space between the cylinders containing trapped air;
   water inlet means connected to one cylinder end and communicating with its aperture;
   water outlet means connected to the other cylinder end and communicating with its aperture;
   a first hollow curved tube coupled at one open end to an aperture in one cylinder end and having its other open end pointing toward said one cylinder end, said first tube being disposed in said inner cylinder; and
   a second hollow tube disposed in the inner cylinder with one open end coupled to the aperture in the other cylinder end and having its other open end pointing toward said other cylinder end.

2. A device as set forth in claim 1 wherein each means is adapted to be threadedly attached to a pipe.

3. A device as set forth in claim 1 wherein each means is adapted to be sweated onto a pipe.

4. A device as set forth in claim 1 further including a barrier plate extending between the two said other open ends of the tubes, secured to the inner wall of the inner cylinder and having its longitudinal axis aligned with the axis of the cylinder.

5. A device as set forth in claim 4 wherein said other open ends of the tubes are disposed on opposite sides of said plate.